United States Patent [19]

Evans

[11] Patent Number: 4,991,426

[45] Date of Patent: Feb. 12, 1991

[54] CALIBRATION OF AIR LEAK DETECTION APPARATUS

[75] Inventor: Arthur C. Evans, Union Lake, Mich.

[73] Assignee: Oakland Engineering, Inc., Pontiac, Mich.

[21] Appl. No.: 397,507

[22] Filed: Aug. 22, 1989

[51] Int. Cl.$^5$ .................. G01M 3/02; G01M 3/24
[52] U.S. Cl. .................. 73/40.7; 73/592; 73/1 R; 73/40
[58] Field of Search .......... 73/40.5 A, 40.7, 40, 73/592, 1 R, 1 DV, 1 G, 4 R, 3

[56] References Cited

U.S. PATENT DOCUMENTS

| | | | |
|---|---|---|---|
| 3,159,998 | 12/1964 | Minter | 73/40.7 |
| 3,266,296 | 8/1966 | Hall | 73/40.5 A |
| 3,516,278 | 6/1970 | Klein et al. | 73/1 G |
| 3,859,845 | 1/1975 | Sawyer | 73/40 X |
| 3,872,712 | 3/1975 | Wetervelt et al. | 73/40 |
| 4,523,452 | 6/1985 | Braymen | 73/40 |
| 4,794,784 | 1/1989 | Bley | 73/1 G |
| 4,809,538 | 3/1989 | Fisch | 73/40.5 A |
| 4,845,360 | 7/1989 | Landfors | 73/40.7 X |
| 4,846,166 | 7/1989 | Willeke | 128/201.24 X |
| 4,852,390 | 8/1989 | Fisch | 73/40.5 A |

FOREIGN PATENT DOCUMENTS

| | | | |
|---|---|---|---|
| 2551461 | 5/1977 | Fed. Rep. of Germany | 73/40.7 |
| 237042 | 10/1986 | Japan | 73/1 G |
| 905685 | 2/1982 | U.S.S.R. | 73/40.7 |
| 1201704 | 12/1985 | U.S.S.R. | 73/592 |
| 1323888 | 7/1987 | U.S.S.R. | 73/1 G |
| 1370471 | 1/1988 | U.S.S.R. | 73/40.7 |

OTHER PUBLICATIONS

"Extending the Range of Leak Detectors", *NASA Tech. Briefs*, Spring 1979, vol. 4, No. 1, p. 105, by M. E. Bull, in 73/40.7.

*Primary Examiner*—Tom Noland
*Attorney, Agent, or Firm*—Barnes, Kisselle, Raisch, Choate, Whittemore & Hulbert

[57] ABSTRACT

Method and apparatus for testing leak integrity of a workpiece such as a wheel rim in which the rim is positioned within an air-tight housing with the axial rim edges is sealing engagement with opposed wall portions of the housing so as to form first and second chambers within the housing internally and externally of the rim. One of such chambers is supplied with air under pressure. Microphones are positioned in the other chamber for detecting leakage of air through the rim as a function of intensity of ultrasonic radiation emitted thereby. The test apparatus is calibrated to detect air leakage that exceeds a pre-specified maximum allowable air flow rate by removably mounting a calibration orifice on a test workpiece, with the orifice being sized to provide the pre-specified maximum allowable leakage flow rate for a satisfactory workpiece at the operating pressure of the apparatus. With the test workpiece in place, the detection electronics is adjusted to indicate an unsatisfactory workpiece when the microphone output exceeds the level associated with air flow through the test orifice.

12 Claims, 1 Drawing Sheet

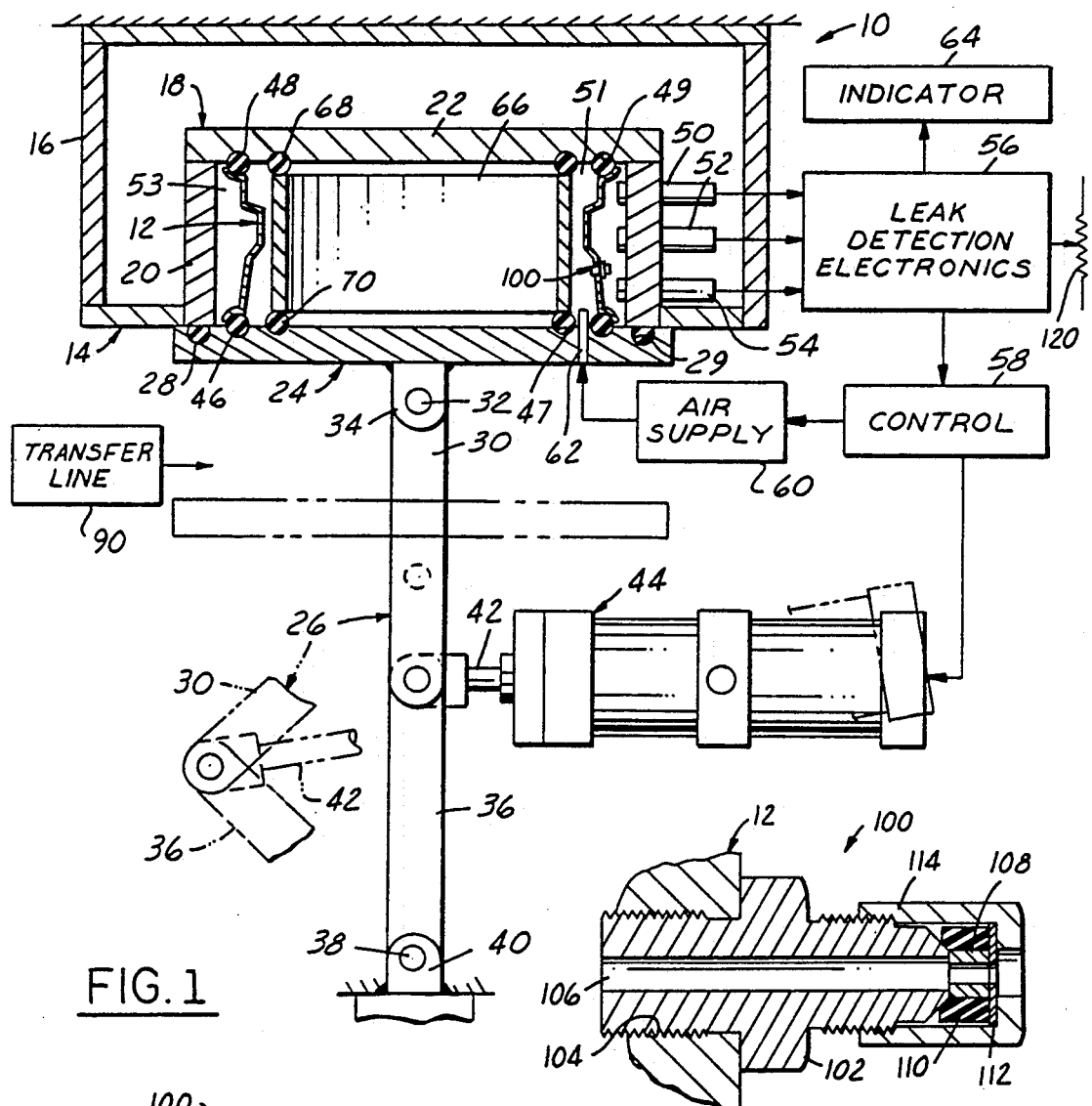
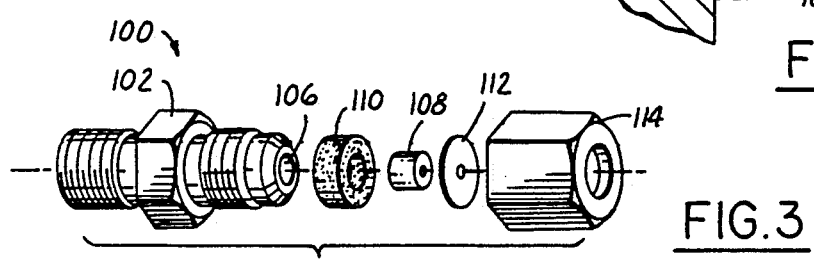
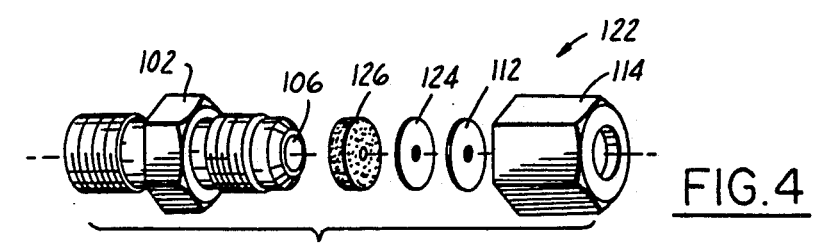

CALIBRATION OF AIR LEAK DETECTION APPARATUS

The present invention is directed to detection of air leaks in workpieces, and more particularly to a method and apparatus for calibrating leak detection equipment to detect air leakage that exceeds a pre-specified maximum allowable air flow rate.

BACKGROUND AND OBJECTS OF THE INVENTION

It has heretofore been proposed to test for air leaks in closed and semi-closed structures ultrasonically in a soundproof enclosure. U.S. Pat. No. 4,809,538 and application Ser. No. 222,018 filed July 21, 1988, and now U.S. Pat. No. 4,852,390; both assigned to the assignee hereof, disclose leak detection apparatus in which a transfer line sequentially feeds a plurality of closed or semiclosed workpieces, such as vehicles wheels, oil pans, valve covers or catalytic converter housings, to a test station. An elevator at the test station lifts each workpiece in sequence from the transfer line to an elevated position at which the workpiece is disposed within and enclosed by a sound chamber. The sound chamber is formed by a cup-shaped enclosure wall having an open bottom edge that sealingly engages the elevator in the upper or test position of the latter. An air supply selectively feeds air under pressure into the workpiece enclosed in the chamber, and one or more microphones ultrasonically detect air leakage from within the workpiece.

Automated test apparatus of the described character has enjoyed substantial commercial acceptance and success. However, further improvements remain desirable. For example, problems have been encountered in attempting to calibrate the leak detection equipment to a maximum allowable flow rate at a given air pressure specified by the workpiece manufacture or customer. Workpieces that are known to exceed allowable leakage flow rate have been employed for calibration proposes. However, while such a "know leaker" can be employed for qualitative examination of the microphone outputs, they cannot be readily employed for qualitative control proposes to set a microphone output threshold corresponding to the desired maximum allowable flow rate for an acceptable workpiece. Further, the air passages in the test piece become clogged with dirt and debris, whereupon the test piece must be replaced by another known leaker that may have completely different leakage characteristics.

Accordingly, it is general object of the present invention to provide a method and apparatus for calibrating leak detection equipment of the described character that provide an accurate and repeatable qualitative vehicle for calibrating the equipment to a pre-specified maximum allowable flow rate for satisfactory workpieces, that may be readily employed periodically during an automated test operation for recalibrating the equipment, that may be readily modified in the event of a change in specified allowable flow rate, and that may be readily cleaned or repaired in the event of clogging by dirt or other debris in the test equipment.

BRIEF DESCRIPTION OF THE DRAWINGS

The invention, together with additional objects, features and advantages thereof, will be best understood from the following description, the appended claims and the accompanying drawing in which:

FIG. 1 is a side sectional view illustrating apparatus for testing leak integrity of a wheel rim in accordance with one presently preferred implementation of the invention;

FIG. 2 is a fragmentary sectional view on enlarged scale of a portion of the test wheel illustrated in FIG. 1;

FIG. 3 is a an exploded perspective view of the calibration orifice illustrated in FIGS. 1-2; and FIG. 4 is an exploded perspective view similar to that of FIG. 3 but illustrating a modified calibration orifice construction.

DETAILED DESCRIPTION OF PREFERRED EMBODIMENTS

FIG. 1 illustrates apparatus 10 in accordance with one presently preferred implementation of the invention for testing a preformed butt-welded wheel rim 12 for air leakage through the butt weld. Apparatus 10 includes a housing 14 having a closed external wall 16 mounted (by means not shown) in fixed position above a rim transfer line. An internal housing section 18 comprises a sidewall 20 and a top wall 22, housing 18 being thus essentially cup-shaped and opening in the downward direction. An elevator plate 24 is carried by a linkage assembly 26 (and guided by means not shown) for vertical movement beneath housing 14 from a lowered or retracted position illustrated in phantom to an upper or test position illustrated in solid lines. In such upper position, an annular sealing gasket 28 carried within a corresponding channel or groove 29 on the upper surface of plate 24 engages the lower edge of sidewall 20 so as to close housing 18 and thereby form a sealed test enclosure.

Linkage assembly 26 includes a first link 30 pivotally coupled at its upper end 32 to a bracket 34 centrally depending from plate 24. A second link 36 is pivotally coupled at its lower end 38 to a fixed bracket 40 positioned beneath plate 24 in vertical alignment with bracket 34. The other ends of links 30, 36 are pivotally coupled to each other at an end of the rod 42 of an actuator 44, which may be electric, pneumatic or hydraulic. Thus, when rod 42 is extended to the position shown in phantom FIG. 1, elevator plate 24 is retracted beneath housing 14 for placement of a test rim thereon. Withdrawal of rod 42 into actuator 44 in the energized position illustrated in solid line in FIG. 1 lifts rim 12 to the test position within housing 18. A pair of annular seals 46, 48 are respectively carried in opposed coaxial positions in the channels 47, 49 on the upper surface of plate 24 and a lower surface of housing wall 22 for respective compressive sealing engagement with opposed edges of test rim 12 positioned therebetween, thereby effectively forming first and second chambers 51, 53 within housing 18 internally and externally of the wheel rim.

A plurality of microphones 50, 52, 54 are positioned on sidewall 20 and project into inner housing 18. Most preferably, microphones 50, 52, 54 are in axial alignment with each other and are radially aligned with the butt weld of rim 12 when the latter is fixtured within housing 18. Microphones 50-54 are of a type that detect ultrasonic radiation to provide corresponding electrical signals to the leak detection electronics 56 as a function of intensity of such radiation. Detection electronics 56 is coupled to control electronics 58 for selectively energizing actuator 44, and to an air supply 60 for selectively feeding air under pressure through a nozzle 62 carried by plate 24 to chamber 51 internally of test rim 12.

In the presently preferred implementation of the invention, test workpieces, specifically wheels 12, are fed to apparatus 10, and withdrawn from apparatus 10 and fed to reject or further processing stations, by means of a fully automatic indexing transfer line 90 (FIG. 1). Such transfer line is disclosed in U.S. Pat. No. 4,809,538 assigned to the assignee hereof. To the extend thus far described, apparatus 10 is substantially the same as that disclosed in U.S. application Ser. No. 222,018 filed July 21, 1988 and likewise assigned to the assigned hereof.

In operation, wheel rim 12 is preferably pre-sprayed with a surfactant for enhancing emission of ultrasonic radiation in the event of air leakage therethrough. Rim 12 is then placed on elevator plate 24 with one edge in engagement with seal 46, and with the rim butt weld in a position for radial opposition to microphones 50, 52, 54. Actuator 44 is then energized and plate 24 propelled upwardly so that the opposing edge of rim 12 engages seal 48, rim 12 being compressed between seals 46, 48 and thereby forming internal and external sound chambers 51, 53 as previously described. Air is then supplied under pressure through nozzle 62, and any leakage through cracks or apertures in the rim butt weld (or anywhere else in the rim) is manifested by ultrasonic energy detected by one or more of the microphones 50, 52, 54. Electrical signals resulting therefrom are compared to one or more predetermined thresholds set by an adjustable resistor 120 or the like, and a failed test is indicated at indicator 64 where appropriate. In the embodiment of the invention illustrated in FIG. 1 for testing wheel rims prior to affixation of the mounting disc thereto, an annular insert 66 is preferably positioned within the wheel rim in engagement with upper and lower seals 68, 70 on wall 22 and plate 24 for reducing the volume of internal pressure chamber 51 and thereby reducing load on air supply 60.

In accordance with the present invention, apparatus 10 is calibrated to a maximum allowable leakage air flow rate at a given air pressure, pre-specified by the manufacturer or customer for a satisfactory part, by selecting a workpiece 12 and mounting a calibration orifice assembly 100 thereon. As shown in FIGS. 2 and 3, orifice assembly 100 in a preferred embodiment of the invention comprises a fitting 102 removably mounted in a threaded opening 104 formed in test workpiece 12 and having a central passage 106 extending axially therethrough. An orifice sleeve 108 is mounted on the other or outer end of fitting 102 by an annular resilient gasket 110 that surrounds sleeve 108, a backing disc 112 having a central opening, and a nut 114 that is threadably received onto the end of fitting 102 so as to compress gasket 110 over the tapered fitting end and align the central openings of orifice sleeve 108 and disc 112 with passage 106 of fitting 102. The passage that extends through orifice sleeve 108 is of a size coordinated with the test pressure within chamber 51 from air supply 60 (FIG. 1) so as to provide controlled leakage of air through orifice assembly 100 at the pre-specified maximum allowable flow rate. Thus, for example, a manufacturer or customer may specify a maximum allowable leakage flow rate for wheels 12 of 2 cc/min at 80 p.s.i air pressure. Orifice of sleeve 108 may have a size of 0.0002 inches for providing the 2 cc/min maximum allowable flow rate at an apparatus test air pressure of 80 psi.

In operation, when it is desired to calibrate apparatus 10, test part 12 is placed within housing 18 as illustrated in FIG. 1, preferably with orifice assembly 100 positioned adjacent to microphones 50-54 as shown. Air is then supplied to the test housing at normal test pressure, and the leak detection threshold of electronics 56 is adjusted, as by variable resistor 120 (FIG. 1) or the like. Thereafter, indicator 64 will indicate an unacceptable workpiece during normal operation when the air leakage through the workpiece exceeds the maximum allowable threshold set by resistor 120. The test equipment may be recalibrated at will by merely placing the calibration workpiece on transfer line 90. If the specified maximum allowable flow rate is changed, the calibration workpiece may be modified accordingly by merely replacing orifice sleeve 108.

FIG. 4 illustrates a modified orifice assembly 122 in which orifice sleeve 108 is replaced by an orifice disc 124 that is sandwiched by nut 114 against the tapered end of fitting 102 between backing disc 112 and a seal 126. Fitting assembly 100 of FIGS. 1-3 is preferred because orifice sleeve 108 may be economically manufactured using standard powdered metallurgy techniques, whereas orifice disc 124 is more expensive to manufacture. However, the embodiment of FIG. 4 has the advantage that orifice disc 124 may be readily cleaned, whereas orifice sleeve 108 (FIGS. 2-3) would normally be discarded in the event of clogging. It will be noted that, in both orifice assembly embodiments 100, 122, the actual test orifice is positioned closely adjacent to the outer end of the fitting assembly so that the orifice may be wetted by surfactant prior to a calibration operation.

The invention claimed is:

1. Apparatus for testing a workpiece of predetermined contour for air leak integrity specified by a maximum allowable air flow rate at a specified pressure, said apparatus comprising: an air-tight housing, means for positioning a workpiece in sealing engagement with portions of said housing so as to form first and second chambers within said housing internally and externally of the workpiece, means for supplying air at a test pressure to one of said chambers, means for detecting leakage of air through the workpiece into the other of said chambers and thereby indicating absence of leak integrity at the workpiece, and means for calibrating said leakage-detecting means to said maximum allowable flow rate at said specified pressure comprising:
  a test part having a contour coordinated with said predetermined workpiece contour for sealing engagement with said portions of said housing to form said first and second chambers, and means on said test part forming an orifice for controlled leakage of air between said chambers, said orifice having a size coordinated with said test pressure to permit air flow through said orifice at a flow rate corresponding to said maximum allowable flow rate at said specified pressure.

2. The apparatus set forth in claim 1 wherein said leakage-detecting means includes means for indicating a leakage condition when air leakage through the workpiece exceeds a threshold, and wherein said calibrating means includes means for selectively adjusting said threshold to a level corresponding to said flow rate through said orifice at said test pressure.

3. The apparatus set forth in claim 2 wherein said leakage-detecting means comprises at least one microphone for detecting air leakage as a function of ultrasonic energy emitted by passage of air through a workpiece and providing an electrical signal as a function of such energy, and leak detection electronics for indicating a leakage condition when said electrical signal exceeds said threshold.

4. The apparatus set forth in claim 1 wherein said test part comprises said workpiece having said orifice-forming means mounted thereon.

5. In a method of testing a workpiece against air leakage that includes the steps of:
   (a) positioning the workpiece in a closed housing to form first and second sealed chambers within said housing internally and externally of the workpiece,
   (b) directing air at test pressure into one of said chambers,
   (c) monitoring the other of said chambers for ultrasonic radiation indicative of air leakage through the workpiece, and
   (d) indicating a leak condition at the workpiece when said ultrasonic energy exceeds a preset threshold;
   the improvement for calibrating said steps (c) and (d) to detect and indicate air leakage through the workpiece at a rate that exceeds a pre-specified maximum allowable flow rate at a specified air pressure, comprising the additional steps of:
   (e) forming an orifice in a substantial duplicate of said workpiece having a diameter coordinated with said test pressure to provide an air flow rate through said orifice equal to said pre-specified flow rate,
   (f) positioning in said housing said workpiece having said orifice formed in said step (e),
   (g) directing air at said test pressure into said housing and monitoring for ultrasonic radiation as recited in said steps (b) and (c), and
   (h) setting said threshold at a level corresponding to ultrasonic radiation resulting from air flow thorough said orifice.

6. The method set forth in claim 5 wherein said step (e) comprises the step of removably affixing said orifice on said workpiece.

7. The method set forth in claim 5 comprising the additional step, prior to said step (f), of placing a surfactant on said orifice.

8. Apparatus for testing a workpiece of predetermined contour for air leak integrity specified by a maximum allowable air flow rate at a specified pressure, said apparatus comprising: an air-tight housing, means for positioning a workpiece in sealing engagement with portions of said housing so as to form first and second chambers within said housing internally and externally of the workpiece, means for supplying air at a test pressure to one of said chambers, means for detecting leakage of air through the workpiece into the other of said chambers and thereby indicating absence of leak integrity at the workpiece, and means for calibrating said leakage-detecting means to said maximum allowable flow rate at said specified pressure comprising:
   a test part having a contour coordinated with said predetermined workpiece contour for sealing engagement with said portions of said housing to form said first and second chambers, and means on said test part forming an orifice for controlled leakage of air between said chambers, said orifice having a size coordinated with said test pressure to permit air flow through said orifice at a flow rate corresponding to said maximum allowable flow rate at said specified pressure, said test part comprising a workpiece having said orifice-forming means mounted thereon.

9. The apparatus set forth in claim 8 wherein said orifice-forming means comprises a fitting mounted on said test part and having an air passage extending therethrough, an orifice, and means removably mounting said orifice on one axial end of said fitting in alignment with said passage.

10. The apparatus set forth in claim 9 wherein said orifice-mounting means comprises a nut threaded onto said fitting end.

11. The apparatus set forth in claim 8 wherein said leakage-detecting means includes means for indicating a leakage condition when air leakage through the workpiece exceeds a threshold, and wherein said calibrating means includes means for selectively adjusting said threshold to a level corresponding to said flow rate through said orifice at said test pressure.

12. The apparatus set forth in claim 11 wherein said leakage-detecting means comprises at least one microphone for detecting air leakage as a function of ultrasonic energy emitted by passage of air through a workpiece and providing an electrical signal as a function of such energy, and leak detection electronics for indicating a leakage condition when said electrical signal exceeds said threshold.

* * * * *